United States Patent
Birdi et al.

(10) Patent No.: US 8,074,777 B2
(45) Date of Patent: *Dec. 13, 2011

(54) BALL SCREW RESETTABLE MECHANICAL DISCONNECT

(75) Inventors: Balwinder S. Birdi, Tucson, AZ (US);
Michael W. Duddeck, Tucson, AZ (US);
William M. Scherzinger, Tucson, AZ (US); Miguel A. Guzman, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 1122 days.

This patent is subject to a terminal disclaimer.

(21) Appl. No.: 11/848,123

(22) Filed: Aug. 30, 2007

(65) Prior Publication Data

US 2009/0056498 A1 Mar. 5, 2009

(51) Int. Cl.
*H02K 7/102* (2006.01)
*F16D 11/04* (2006.01)
(52) U.S. Cl. ............ 192/17 C; 192/69.81; 192/90; 192/101; 192/114 R; 322/12
(58) Field of Classification Search ............ 192/24, 192/17 C, 69.2, 94, 102; 322/12
See application file for complete search history.

(56) References Cited

U.S. PATENT DOCUMENTS

| | | | |
|---|---|---|---|
| 2,509,813 A * | 5/1950 | Dineen | 192/101 |
| 2,642,970 A | 6/1953 | Szekely | |
| 3,071,227 A | 1/1963 | Grisier, Jr. | |
| 4,167,695 A | 9/1979 | Phillips | |
| 4,269,293 A * | 5/1981 | Martin | 192/94 |
| 4,498,350 A * | 2/1985 | Ross | 74/89.42 |
| 4,546,865 A | 10/1985 | Hodgman et al. | |
| 4,637,272 A | 1/1987 | Teske | |
| 4,685,550 A | 8/1987 | Metcalf | |
| 5,186,573 A | 2/1993 | Flotow | |
| 7,728,477 B2 * | 6/2010 | Birdi et al. | 192/94 |
| 7,896,147 B2 * | 3/2011 | Burke et al. | 192/90 |
| 7,946,403 B2 * | 5/2011 | Burke et al. | 192/90 |
| 2006/0081433 A1 | 4/2006 | Skorucak | |

FOREIGN PATENT DOCUMENTS

| | | |
|---|---|---|
| EP | 1449704 | 8/2004 |
| EP | 1449704 A2 | 8/2004 |
| EP | 1548311 | 6/2005 |
| EP | 1548311 A2 | 6/2005 |

OTHER PUBLICATIONS

EP Search Report—Apr. 28, 2001—Application No. 08163015.4-2423 / 2031264.

* cited by examiner

*Primary Examiner* — Rodney Bonck
(74) *Attorney, Agent, or Firm* — Miriam Jackson, Esq.

(57) ABSTRACT

A disengagement/disconnect assembly for disengaging a generator from a gear box includes an inner ball screw having an angled threading on an outer surface thereof and surrounding and operatively engaged to a rotating generator drive shaft to cause rotation of the inner ball screw, the inner ball screw having axial dog teeth engaged to corresponding teeth of the gear box drive shaft, an outer ball screw surrounding and normally rotating with the inner ball screw and having a spherical ball and an angled ball track between the inner and outer ball screws, a lock, and a brake for slowing or stopping rotation of the outer ball screw so that the inner ball screw rotates relative to the outer ball screw along the ball track and slides axially toward the lock thereby disengaging the generator from the gear box drive shaft.

17 Claims, 4 Drawing Sheets

BALL SCREW RESETTABLE MECHANICAL DISCONNECT

BACKGROUND OF THE INVENTION

The present invention generally relates to apparatus and methods for disengaging generators and other rotating machines from a gearbox and, more particularly, to apparatus and methods of disengaging an aircraft generator from a gear box to prevent damage to the gear box.

In the aerospace industry, aircraft receive electric power from generators. The generators are coupled to the main engine or to auxiliary power units through the gear box. Known designs of generators have a generator drive shaft that includes some kind of shear section that is based on safe operational capability of the gearbox. In the event that the generator malfunctions, this shear section operates and protects the gear box from continuing to rotate under an unacceptable load from a malfunctioning generator that may have stopped rotating. For constant speed generators, the design of the shear section is not difficult—it is easy to design a shear section to meet one speed. However, with the evolution of variable frequency generators (VFG), where failure can occur over a range of speeds, it is rather difficult to design a shear section that can protect the gear box regardless of the multiple possible speeds of the generator.

It is therefore useful that some other means should be incorporated into the design of the generator that would help protect the gear box. If, for example, there is a minor fault with the generator and it is not producing any power but rather is rotating like a load on the gear box, it is desirable that the generator be de-coupled from the gear box.

As can be seen, there is a need to de-couple the generator from the gear box as needed when the generator malfunctions. Furthermore, there is a need to have such a de-coupling mechanism that is re-settable by the operator or maintenance personnel of the aircraft when the problem with the generator is fixed or addressed. It is also required that the disconnect mechanism not disengage unnecessarily and not inadvertently engage when disconnected

SUMMARY OF THE PRESENT INVENTION

In one aspect of the present invention, there is presented a disengagement assembly for disengaging a rotating machine from an accessory, the disengagement assembly comprising: a rotatable inner ball screw having an angled threading on an outer surface thereof, the inner ball screw operatively engaged to the rotating machine, the inner ball screw capable of engaging and disengaging the accessory, the accessory distal to the rotating machine; an outer ball screw surrounding the inner ball screw; an angled ball track between the inner ball screw and the outer ball screw; a ball bearing traveling on the angled ball track; and a brake capable of slowing or stopping rotation of the outer ball screw so that the inner ball screw rotates relative to the outer ball screw along the ball track and slides axially away from the accessory thereby disengaging the rotating machine from the accessory.

In a further aspect of the invention, there is presented a method of disengaging a rotating machine from an accessory, the method comprising: engaging the accessory with an inner ball screw having an angled threading on an outer surface thereof, the accessory distal to the rotating machine; engaging the inner ball screw with an outer ball screw that rotates with the inner ball screw, including an angled ball track between the inner ball screw and the outer ball screw on which a ball bearing travels, and actuating a brake to slow or stop rotation of the outer ball screw so that the inner ball screw rotates relative to the outer ball screw along the ball track and slides axially away from the accessory thereby disengaging the rotating machine from the accessory.

In another aspect of the invention, there is presented a disengagement assembly for disengaging a rotating machine from an accessory, the disengagement assembly comprising: a coupler between the accessory and the rotating machine, the coupler including an outer ball screw and an inner ball screw, the inner ball screw capable of moving relative to the outer ball screw, the coupler operatively engaged to the rotating machine and capable of engaging and disengaging the accessory; and a re-settable lock capable of preventing the coupler from re-engaging the accessory after the coupler has disengaged from the accessory.

These and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a disengagement assembly/mechanism for a rotating machine, such as an aircraft generator, for disengaging the generator from a gear box. Typically the drive shaft of the generator may be rotating and operatively engaged to the drive shaft of the gear box. When the generator is not working properly, for example in an aircraft, the disengagement mechanism may allow the pilot to disengage the generator from the gear box. The disengagement mechanism can be a modular or standalone assembly having its own housing separate from the housing of the generator, or alternatively the disengagement mechanism can be subsumed within the housing of the generator. The disengagement mechanism may be used in aircraft and may be re-settable manually on the ground, presumably after the aircraft lands and the functioning of the generator has been investigated and if necessary fixed.

In contrast to the prior art, which does not use a ball screw mechanism, the disengagement assembly of the present invention utilizes an efficient and reliable ball screw mechanism including an inner ball screw, an outer ball screw, a ball track and ball bearings. This ball screw mechanism of the present invention may serve to maintain minimal internal friction, as opposed to other prior art disengagement mechanisms, for example a screw type drive and clutch mechanism.

In further contrast to the prior art, in which the disconnect mechanism has to self-destruct in order to function, the disengagement assembly of the present invention is re-usable and re-settable.

Figure 1:
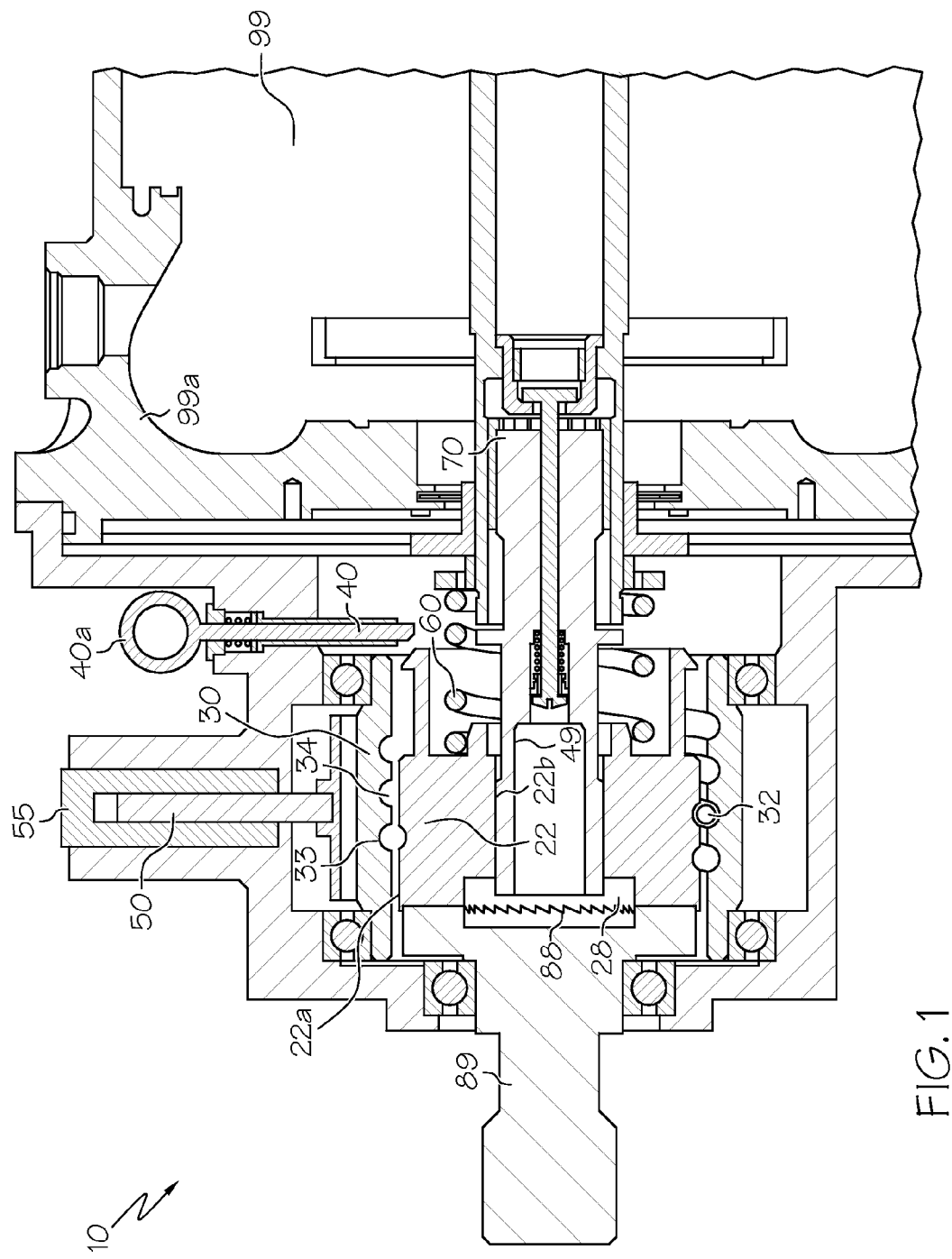
FIG. 1 is a sectional view of the disengagement mechanism according to one embodiment of the present invention in the environment of a generator and a gear box drive shaft wherein the generator in its normal state engaged to the gear box.

As seen from FIG. 1, a disengagement assembly 10 may be used for disengaging a variable frequency generator 99 from a gear box (not shown except for gear box drive shaft adaptor 89). Disconnect/disengagement assembly 10 may comprise a rotatable inner ball screw 22 that has an angled threading 24 on an outer surface 22a of inner ball screw 22.

Since inner ball screw 22, which may function as the inner part of a ball screw, may be hollow, inner ball screw 22 may surround and may be operatively engaged to a generator drive shaft 70 so that the rotation of generator drive shaft 70 may cause rotation of inner ball screw 22. In this regard, there may be radially protruding splines 49 between the surface of generator drive shaft 70 and inner surface 22b of inner ball screw 22. The splines 49, or another suitable structure may serve to transfer the rotational force of the generator drive shaft 70 to inner ball screw 22.

Inner ball screw 22 may have a mating structure 28, such as axial teeth, at an end distal to the generator 99. This mating structure 28 may be normally engaged to a corresponding mating structure 88 of an accessory, in this case the accessory being the gear box drive shaft. The gear box drive shaft that is shown in the drawings is called the gear box drive shaft adaptor 89. This mating structure 28 may include axial dog teeth or angled teeth 28 on inner ball screw 22 in which case the corresponding mating structure 88 of the gear box drive shaft adaptor 89 may also include the mating dog teeth 88 or angled teeth 88 that mate with axial teeth 28.

Figure 2:
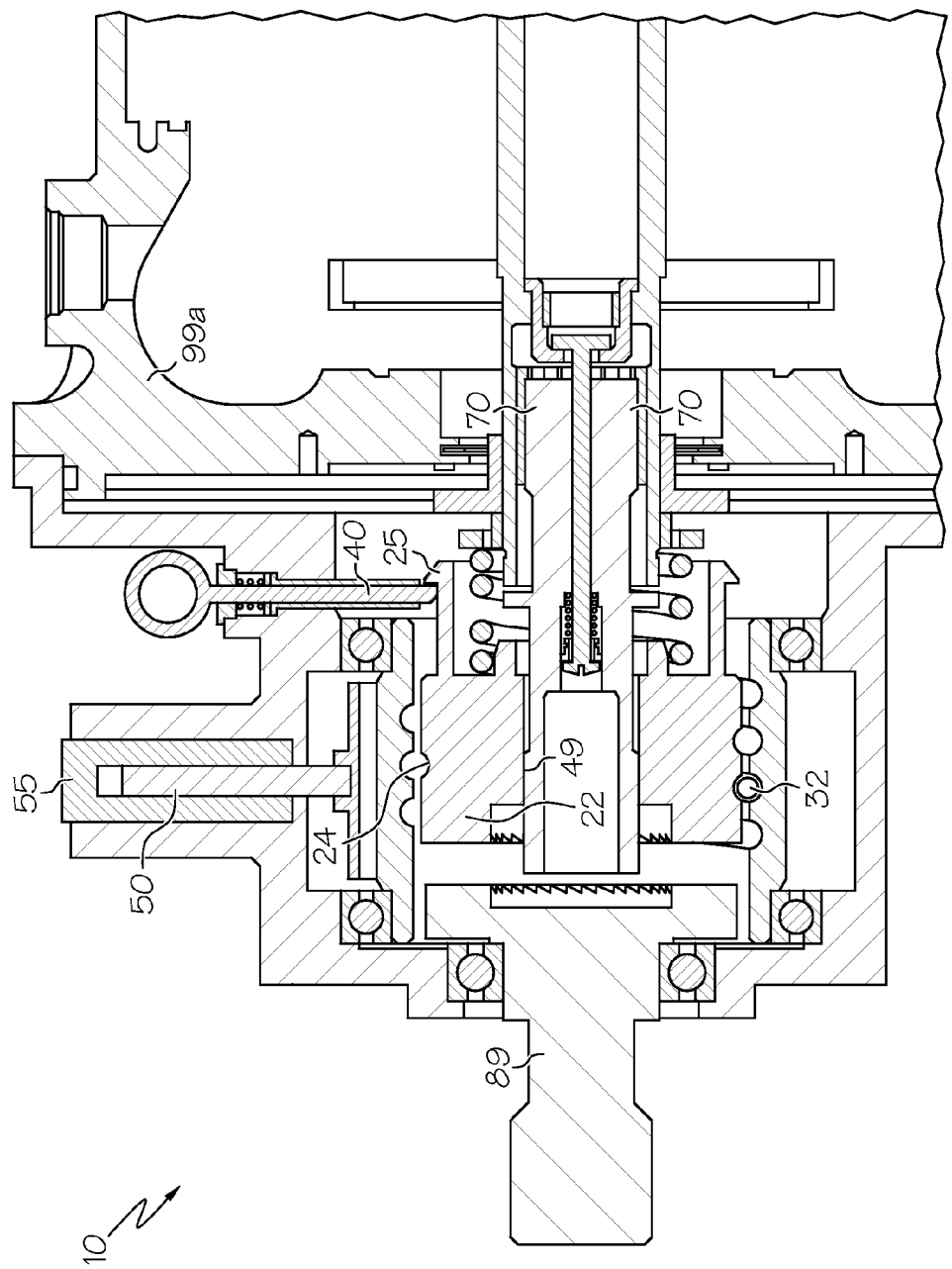
FIG. 2 is a sectional view of the disengagement mechanism of FIG. 1 in the environment of a generator and a gear box drive shaft wherein the inner ball screw has been disengaged from the gear box drive shaft.

Disengagement assembly 10 may also include an outer ball screw 30 which may surround and normally rotates with inner ball screw 22. As seen in FIG. 2, outer ball screw 30 may have associated with it one or more balls 32, called ball bearings, that travel on the angled ball track 34 that exists between the inner ball screw 22 and outer ball screw 30. In one exemplary embodiment, there may be between approximately five and seven such balls depending upon the design requirement. The angled ball track 34 is formed from threading 24 on the inner ball screw 22 and outer threading 33 on a lower side of outer ball screw 30. The fact that the ball track 34 is angled means that ball track 34 has some axial component rather than simply being a series of revolutions around inner ball screw 22.

The disconnect mechanism may also include a locking mechanism 40 for locking inner ball screw 22 in place after inner ball screw 22 has moved laterally/axially away from gear box drive shaft adaptor 89 to disengage generator 99 from the gear box.

As seen in FIG. 1, one example of lock mechanism 40 is shown whereby the lock may be a simple key or pin 40a whose bottom is urged up momentarily by a slanted back shoulder 25 at a proximal end of inner ball screw 22, and then falls back down once slanted back tooth 25 passes key 40a, thereby ensuring that inner ball screw 22 is held in place by lock 40 (i.e. cannot reverse direction) until key 40a is re-set. The re-setting of lock 40 may be performed manually by an operator which may be achieved manually on the ground by releasing lock 40 such as by causing key 40a to be lifted. This may allow springs 60 (see below) to push inner ball screw 22 back to its normal position engaged to the accessory.

As seen in FIG. 2, disengagement assembly 10 may also include a brake 50 that is capable of slowing or stopping rotation of outer ball screw 30. When brake 50 slows or stops rotation of outer ball screw 30, since normally inner ball screw 22 rotates together with outer ball screw 30, this slowing or stopping of the rotation of outer ball screw 30 may cause inner ball screw 22 to rotate relative to outer ball screw 30 along ball track 34 and simultaneously slide axially away from the gear box drive shaft adaptor 89 (which may also mean sliding toward lock 40) thereby disengaging the generator 99 from the gear box drive shaft adaptor 89. When inner ball screw 22 slides axially away from gear box drive shaft adaptor 89, inner ball screw may be sliding on generator drive shaft 70, and more precisely on splines 49 between the surface of generator drive shaft 70 and inner surface 22b of inner ball screw 22.

Accordingly, outer ball screw 30 is capable of rotation and inner ball screw 22 is capable of both rotation and side to side movement. The brake 50 may be connected to a solenoid 55 that is remotely actuatable by a pilot when generator 99 is working properly. Other arrangements may easily be imagined whereby brake 50 may be controlled directly or indirectly by other mechanisms.

Since inner ball screw 22 may constantly vibrate together with the accessory, for example on an airplane, it may be helpful to maintain a minimal axial load on inner ball screw 22 to prevent erosion at the point of contact between them. In order to maintain a minimal axial load (as one example, approximately 60 pounds) on inner ball screw 22, disengagement assembly 10 may include springs 60 at a proximal end of inner ball screw 22. Springs 60 serve to urge inner ball screw 22 toward the accessory, i.e. gear box drive shaft adaptor 89. Accordingly, when inner ball screw 22 has been locked by key 40a and lock 40 is later manually released, inner ball screw 22 automatically reverts to its normal position being engaged to gear box drive shaft adaptor 89 by rotating through ball track 34 in a reverse direction and sliding axially so that axial dog teeth 28 meet corresponding axial teeth 88 of gear box drive shaft adaptor 89. Generator 99 is then re-engaged to the gear box for future normal operation.

The inner ball screw 22 and outer ball screw 30 may together be viewed as a coupler located between the rotating machine and the accessory gearbox wherein inner ball screw 22 may move relative to outer ball screw 30. The coupler is then operatively engaged to the rotating machine/generator and is capable of engaging and disengaging the accessory gear box. The coupler may optionally also include a ball cage that keeps ball 32 at a particular location which helps operation of disengagement assembly 10.

Figure 3:
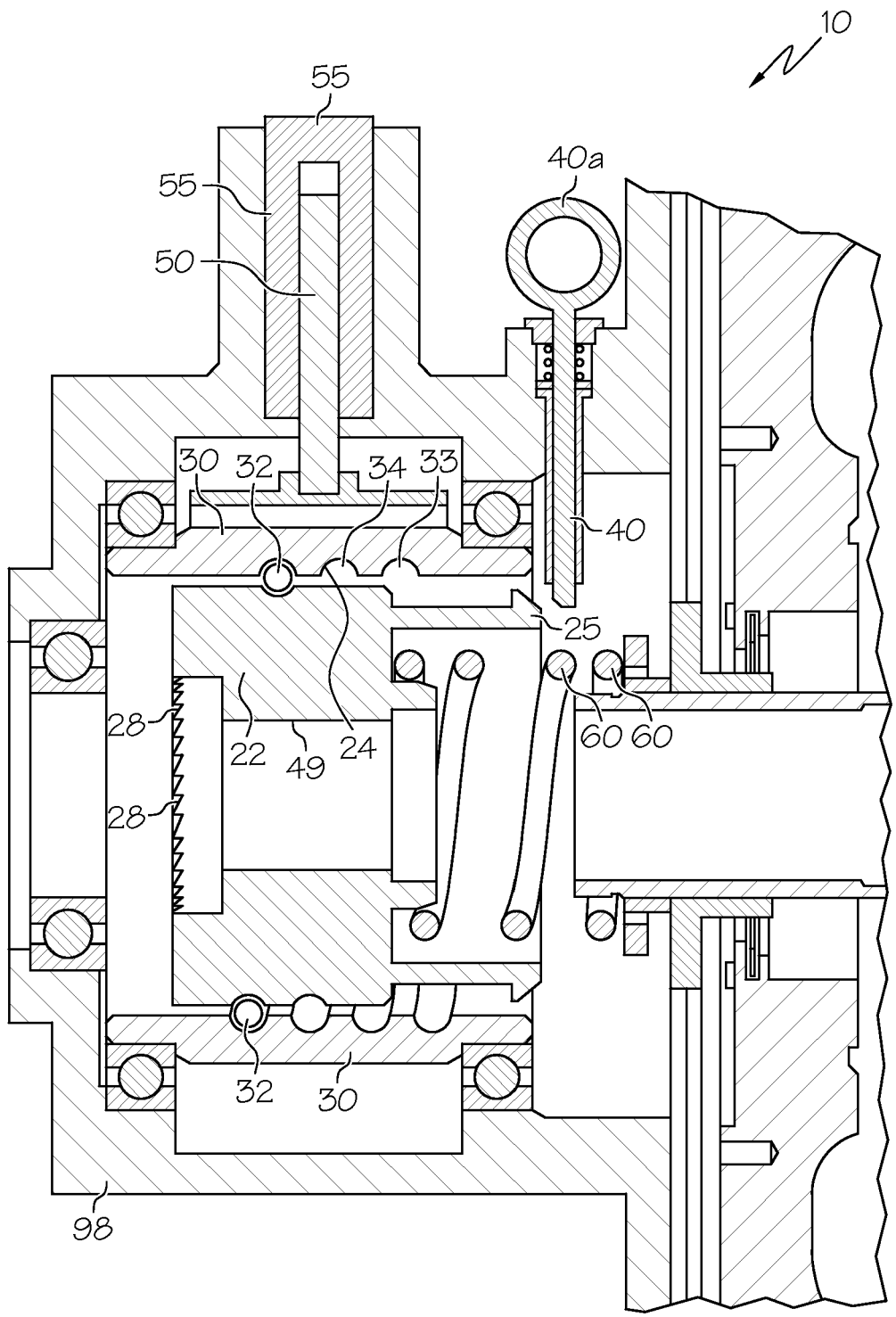
FIG. 3 is a sectional view of the disengagement mechanism of FIG. 1 alone before disengagement from the gear box drive shaft.

Although as seen from FIGS. 1-2, the entire disconnect mechanism 10 may be outside of a housing 99a of generator 99 and may have its own housing 98 (see FIG. 3), it is also contemplated by the present invention that in certain embodiments disengagement/disconnect assembly 10 may also be subsumed within and utilize housing 99a of generator 99.

Under certain conditions, disengagement/disconnect assembly 10 need not include a lock 40 separate from brake 50. In such a case, re-engagement of the rotating machine with the accessory may occur when deactivation of brake 50 causes a resumption or speeding up of the rotation of outer ball screw 30.

Figure 4:
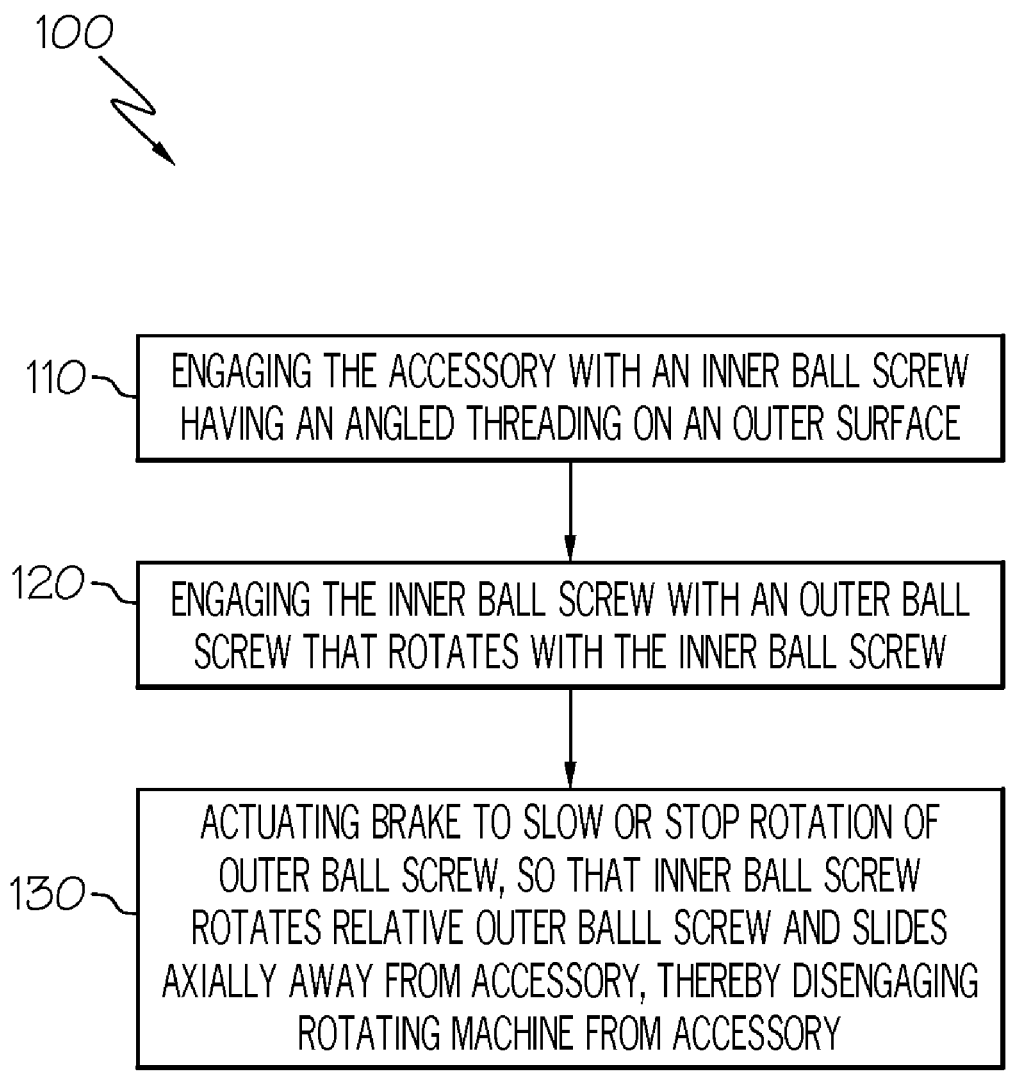
FIG. 4 is a flow chart showing a method of the present invention.

As can be seen from FIG. 4, which is a flow chart, the present invention also envisions a method 100 of disengaging a rotating machine such as a variable frequency generator from an accessory such as a gear box when the rotating machine is not working properly, comprising a step 110 of engaging the accessory with an inner ball screw 22 having an angled threading 24 on an outer surface 22a thereof where the accessory is distal to the rotating machine. The method may also include a step 120 of engaging inner ball screw 22 with an outer ball screw that rotates with inner ball screw 22, including an angled ball track 34 between inner ball screw 22 and outer ball screw 30 on which a ball bearing 32 travels. The method may also include a step 130 of actuating a brake 50 to slow or stop rotation of outer ball screw 30 so that inner ball screw 22 rotates relative to outer ball screw 30 along the ball track 34 and slides axially away from the accessory thereby disengaging the rotating machine from the accessory. After the rotating machine is disengaged form the accessory, a lock 40 may hold inner ball screw 22 to prevent inner ball screw 22 from re-engaging the accessory.

It should be understood, of course, that the foregoing relates to exemplary embodiments of the invention and that modifications may be made without departing from the spirit and scope of the invention as set forth in the following claims.

We claim:

1. A disengagement assembly for disengaging a rotating machine from an accessory, the disengagement assembly comprising:
   a rotatable inner ball screw having an angled threading on an outer surface thereof, the inner ball screw operatively engaged to the rotating machine, the inner ball screw capable of engaging and disengaging the accessory, the accessory distal to the rotating machine;
   an outer ball screw surrounding the inner ball screw;
   an angled ball track between the inner ball screw and the outer ball screw;
   a ball bearing traveling on the angled ball track; and
   a brake capable of slowing or stopping rotation of the outer ball screw so that the inner ball screw rotates relative to the outer ball screw along the ball track and slides axially away from the accessory thereby disengaging the rotating machine from the accessory, wherein
   the inner ball screw has axial dog teeth and wherein a drive shaft of the accessory has dog teeth that mate with the axial dog teeth.

2. The assembly of claim 1, also including a lock capable of preventing the inner ball screw from re-engaging the accessory after the inner ball screw has disengaged from the accessory.

3. The assembly of claim 2, wherein the lock is re-settable.

4. The assembly of claim 1, wherein springs at a proximal end of the shaft urge the inner ball screw toward the accessory thereby keeping a minimal axial load on the inner ball screw.

5. The assembly of claim 1, wherein the brake is connected to a solenoid that is remotely actuatable by a pilot when the rotating machine is working properly.

6. The assembly of claim 1, wherein the disengagement assembly is located outside a housing of the rotating machine.

7. A method of disengaging a rotating machine from an accessory, the method comprising:
   engaging the accessory with an inner ball screw having an angled threading on an outer surface thereof, the accessory distal to the rotating machine;
   engaging the inner ball screw with an outer ball screw that rotates with the inner ball screw, including an angled ball track between the inner ball screw and the outer ball screw on which a ball bearing travels,
   actuating a brake to slow or stop rotation of the outer ball screw so that the inner ball screw rotates relative to the outer ball screw along the ball track and slides axially away from the accessory thereby disengaging the rotating machine from the accessory; and
   mating axial dog teeth on the inner ball screw with dog teeth on a drive shaft of the accessory.

8. The method of claim 7, further comprising preventing the inner ball screw from re-engaging the accessory by applying a lock after the rotating machine is disengaged form the accessory.

9. The method of claim 7, including maintaining a minimal axial load on the inner ball screw by urging the inner ball screw toward the accessory with springs at a proximal end of the inner ball screw.

10. The method of claim 9, including re-engaging the generator with the gear box by means of the springs upon re-setting the lock.

11. The method of claim 7, including remotely actuating a solenoid connected to the brake when the rotating machine is working properly.

12. A disengagement assembly for disengaging a rotating machine from an accessory, the disengagement assembly comprising:
   a coupler between the accessory and the rotating machine, the coupler including an outer ball screw and an inner ball screw, the inner ball screw capable of moving relative to the outer ball screw, the coupler operatively engaged to the rotating machine and capable of engaging and disengaging the accessory;
   a re-settable lock capable of preventing the coupler from re-engaging the accessory after the coupler has disengaged from the accessory and
   springs at a proximal end of the inner ball screw urge the inner ball screw toward the accessory.

13. The assembly of claim 12, wherein the lock is capable of preventing the inner ball screw from re-engaging the accessory after the inner ball screw has disengaged from the accessory.

14. The assembly of claim 13, wherein the lock can be manually re-set.

15. The assembly of claim 12, wherein the lock is manually re-set by a lifting of a key.

16. The assembly of claim 12, wherein when the lock is released the springs are free to urge the inner ball screw to re-engage the accessory.

17. The assembly of claim 16, wherein the lock can be re-set manually.

* * * * *